Patented Mar. 2, 1937

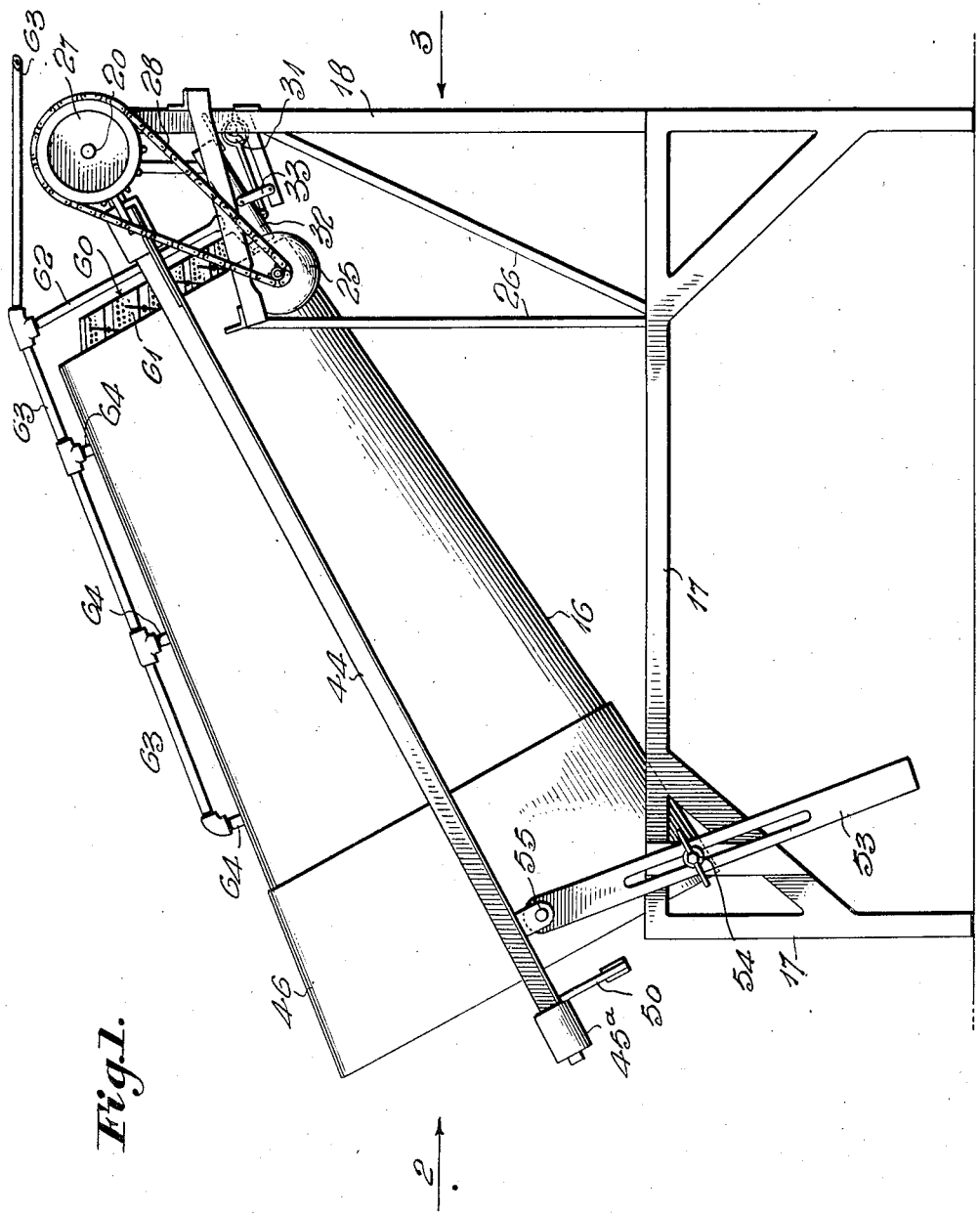

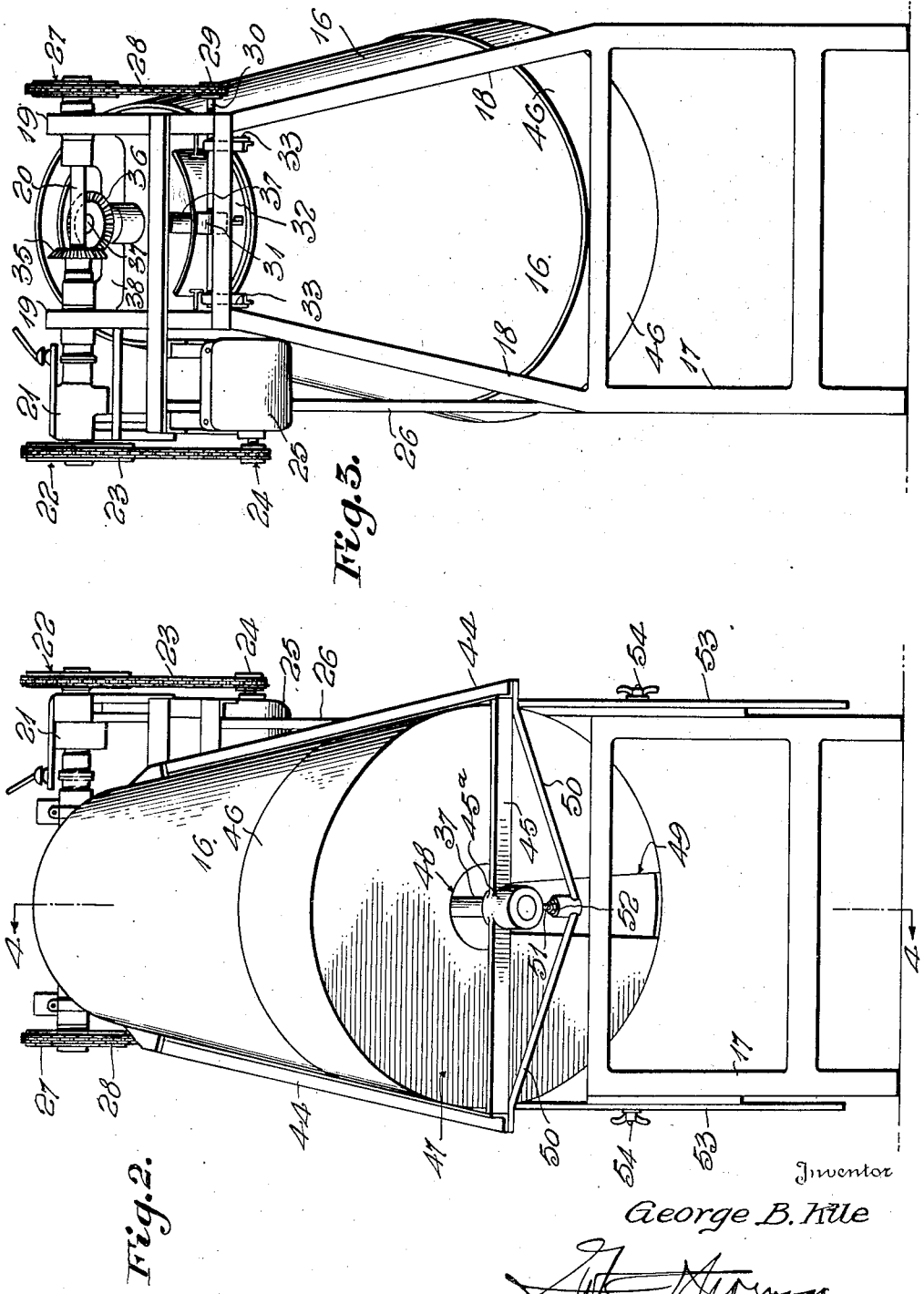

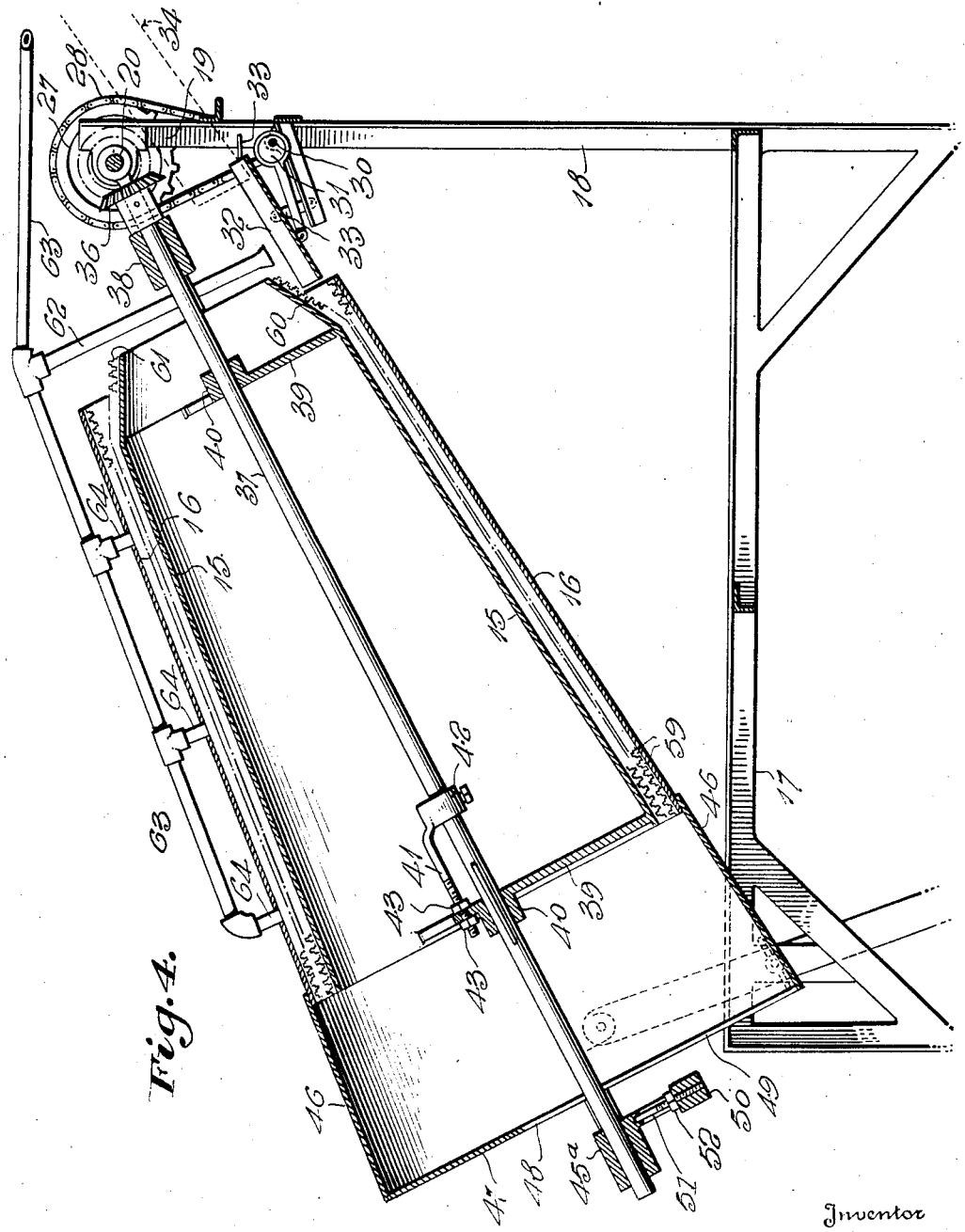

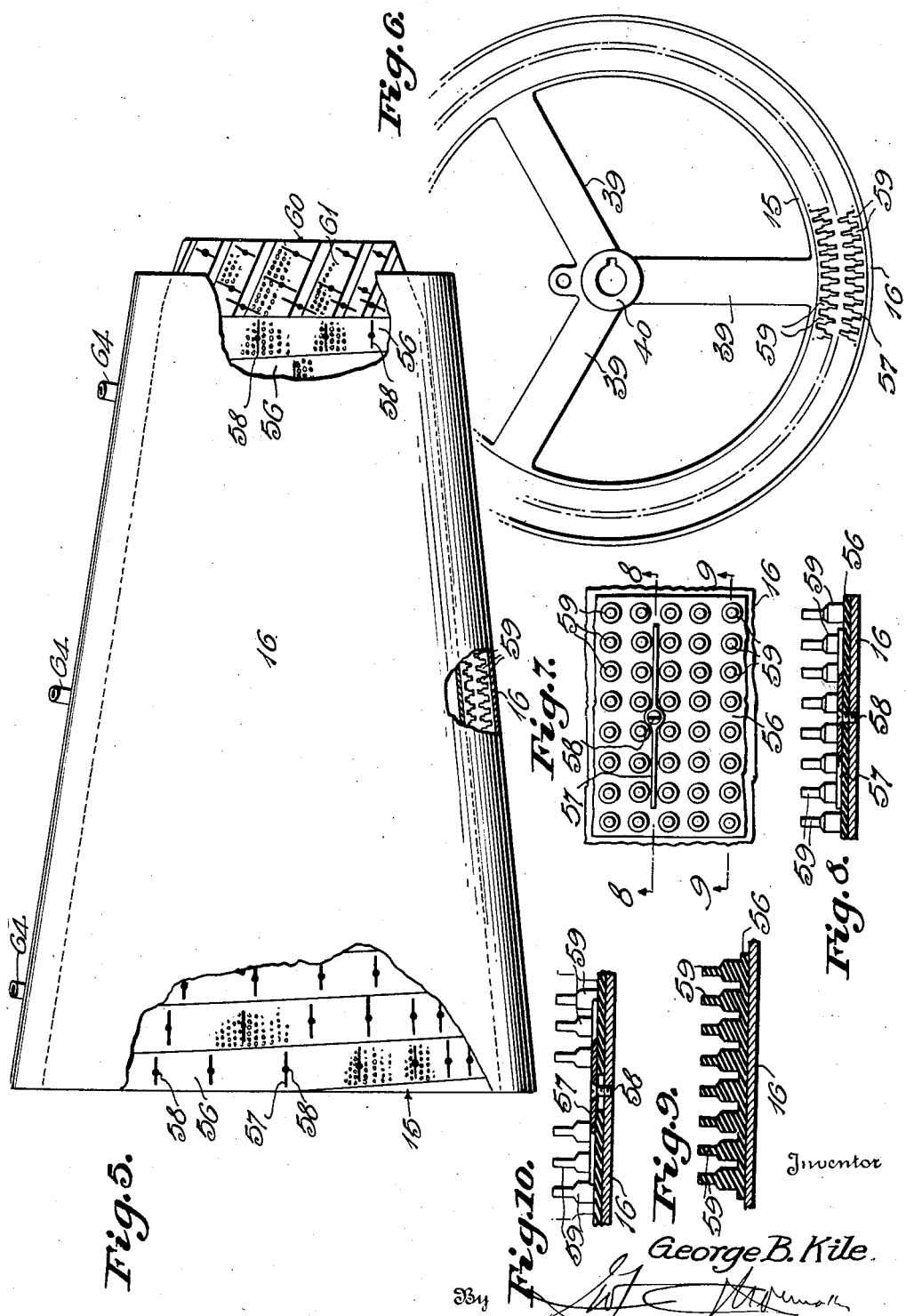

2,072,598

UNITED STATES PATENT OFFICE 2,072,598

BEET PEELER

George B. Kile, Portland, Oreg., assignor to Libby, McNeill & Libby, Chicago, Ill., a corporation of Maine Application February 24, 1936, Serial No. 65,503

7 Claims. (Cl. 146—49)

The present invention relates generally to peeling apparatus, and more particularly to a machine which, while especially adapted to the peeling of beets, may be used effectively and efficiently in connection with potatoes, carrots and other vegetables and many fruits, and has for its primary object to not only completely and economically peel the articles, but to polish the peeled articles and thus considerably improve their appearance, and to this extent, at least, considerably enhance their market value.

A further object is the provision of a beet peeler which may be readily adjusted to beets of different sizes and which will peel the same without taking more from the vegetable than the skin and is thus capable of effective utilization without waste.

A still further object is the provision of a beet peeler which will not bruise, rasp or otherwise mar the surface of the beets and will remove the skins from sharp irregularities and from other surface imperfections or abnormalities of the beets.

The above are but general objects of the invention, and further objects and advantages will be better understood by a careful consideration of the following detailed description of its construction, arrangement and operation, reference being made to the accompanying drawings, which form a part of this specification, and in which, Figure 1 is a side elevation of the complete apparatus.

Figure 2 is a rear end elevation or, in other words, an end view looking at the finishing or discharge end.

Figure 3 is a similar view looking at the feeding or receiving end.

Figure 4 is a vertical longitudinal sectional view taken substantially on line 4—4 of Figure 2.

Figure 5 is a side view, partly in elevation and partly in section, of the two cylinders.

Figure 6 is a partial end view thereof.

Figure 7 is a plan view of a portion of the peeling surface of either cylinder.

Figures 8 and 9 are detail cross sections taken respectively on lines 8—8 and 9—9 of Figure 7, and Figure 10 is a detail cross section taken through a portion of the frusto-conical receiving end of the inner cylinder.

Referring now to these figures, the invention essentially consists of inner and outer cylinders 15 and 16 arranged and supported in coaxial relation, one within the other and one rotatable with respect to the other, so that by the use of means proposed by the invention upon the external surface of the inner cylinder and the internal surface of the outer cylinder, the beets are peeled in the space between the cylinder surfaces as they are gradually shifted from the receiving end to the discharge end of such space.

Preferably the cylinders 15 and 16 taper from relatively large lower ends to relatively small upper ends and are supported on an angle inclined to the horizontal so that gravity effectively enters into the desired slow or gradual movement of the beets throughout the peeling space between the cylinders, and preferably the cylinders have their opposing surfaces covered with flexible mats studded with flexible peeling projections which will operate to the desired end with beets of several sizes or grades and with equal effectiveness as far as the peeling and polishing thereof is concerned.

As shown, the cylinders 15 and 16 are supported at an incline of approximately thirty degrees to the horizontal in a suitable rectangular base frame 17 having at its forward end, corresponding to the receiving end of the cylinders, uprights 18 at opposite sides. Between the upper, inwardly offset ends 19 of the uprights 18 is journaled a shaft 20, one end of which is connected, through a suitable transmission mechanism 21, with a sprocket wheel 22, in turn connected by sprocket chain 23 with the smaller sprocket wheel 24 of the shaft of a motor 25. This motor 25, as best seen in Figures 1 and 3, is mounted on a sub-frame 26 and supplies all the necessary power for the operation of the several parts of the machine.

The other end of shaft 20 has a sprocket wheel 27 connected by a sprocket chain 28 with a sprocket wheel 29 on a somewhat lower transverse shaft 30 from which an eccentric 31 extends into connection with a transversely curved feed apron 32 presenting an upper concave surface and supported at an incline by means of links 33 to thus permit its shaking or vibratory movement by the eccentric 31.

The beets to be peeled are fed in any suitable manner, as, for instance, by a suitable conveyer indicated by dotted lines at 34 in Figure 4, to the inclined shaking feed apron 32 and, by the latter, guided into the upper receiving ends of the cylinders 15 and 16. For the operation of the latter, shaft 20 has an intermediate mitre gear 35 engaging a similar gear 36 on the upper end of a shaft 37. The adjacent upper portion of shaft 37 is journaled in a bearing yoke 38 of U-shape, and the end portions of this yoke are journaled on shaft 20 adjacent to the uprights 18.

The inner cylinder 15 is the rotatable cylinder and is provided adjacent to its opposite ends with internal spiders 39 having centered bearing portions 40 on shaft 37 of which the rear portion 40 has a splined connection with shaft 37 and is also provided with an apertured portion to receive therethrough a threaded adjusting rod 41 having a collar 42 clamped around the shaft 37. Lock nuts 43 are threaded on rod 41 to engage opposite faces of the apertured portion of the bearing spider whereby to adjust the cylinder 15 lengthwise of shaft 37 and lock the same in desired position thereon.

The outer cylinder 16 is non-rotatably mounted in a lengthwise rectangular frame 44 whose upper end pivots with the bearing yoke 38 on shaft 20 and whose lower cross bar 45 has a central bearing 45a for the lower end of shaft 37. This frame 44 also supports a lower collecting and discharging hopper 46 shaped to form a continuation of the lower end of the stationary cylinder 16 and telescoping the latter to a slight degree, so that the hopper thus forms a chamber therein for the reception of the peeled and polished beets which is open to the space between the two cylinders entirely around this space.

The hopper 46 has a lower end wall 47 provided with a central opening 48 around the lower end of shaft 37 and a radial slot-like discharge opening 49 extending downwardly from opening 48 from which the beets finally find their way into suitable containers and the like for the finished product. These openings 48 and 49 permit ready access to the adjusting means 41, 42, and 43 of the inner cylinder 15.

It is preferable that the bearing 45a for the lower end of shaft 37 be effectively braced, and therefore a brace rod and the like 50, having inclined side portions suitably secured at their outer ends to the lower ends of the sides of the frame 44 of the stationary cylinder, supports at its center a threaded jacket shaft 51. This shaft 51, as best seen in Figures 2 and 4, extends upwardly into engagement with bearing 45a and is locked in adjusted position by a lock nut 52.

The two cylinders 15 and 16 are also adjustable as a unit to vary the degree of inclination thereof by means of adjustable supporting bars 53 which, as seen in Figure 1, are lengthwise slotted to receive clamping bolts with wing nuts 54 extending from the supporting frame 17. The upper ends of these bars 53 are pivotally connected at 55 to the frame 44 of the stationary cylinder 16 adjacent to the lower end of the latter.

Figures 5 to 10, inclusive, show the peeling and polishing mats for the cylinders 15 and 16. These mats 56 are for the outer surface of the inner cylinder 15 and the inner surface of the outer cylinder 16, in the form of rectangular strips secured helically of the cylinder surfaces by spaced clamping members 57 transversely of the mats and secured by screws or bolts 58 to the cylinders. Each of the mats presents a plurality of surface studs 59, which, being of rubber like the mats, form abrasive peeling and polishing elements extending toward one another in the space between the cylinders. These studs 59 preferably have reduced outer end portions and it is preferable in practice to so adjust the inner cylinder 15 lengthwise of the shaft 37 as to space the free ends of the flexible abrasive studs 59 of the inner cylinder from those of the outer cylinder.

It is also preferable that the inner cylinder 15 have at its smaller, upper end an extension 60 projecting slightly beyond the projecting corresponding end of the longer outer cylinder 16, as plainly seen in Figures 4 and 5. This extension has a taper substantially more abrupt than that of the cylinders, and the studded mats 61, similar to mats 56 of the cylinders, are secured angularly of the surface of the extension and preferably spaced apart as seen in Figure 5, so that the extension, so covered, will materially aid in the feeding of the beets into the space between the cylinders.

In practice, the beets after blanching are conveyed to the feed apron 32 and from the latter fall into the space between the upper end of cylinder 16 and the extension 60 by which they are gradually worked into the space between the cylinders and there peeled and polished by the action of the studs. The feeding movement of the hot beets from apron 32 is assisted by the spraying of hot water onto the apron through a spray pipe 62 leading from a water feed pipe 63 having branch pipes 64 at spaced points along the outer cylinder 16 and opening therethrough into the space between the peeling and polishing surfaces of the cylinders. By this use of hot water, material assistance is given to the peeling of the beets as well as to the clearing of the peeling space between the cylinders.

As the beets slowly work down through the space between the cylinders, they are constantly rolled by contact of the flexible studs therewith, it being understood that the opposing ends of these studs of the two cylinders are spaced apart a distance less than the diameters of the beets themselves. During such rolling movement, the beets are peeled by the abrasive action of the studs without danger of taking more than merely the outside skin, leaving a smooth, shiny surface with the result that the peeled and polished beets have greater appeal to the eye and correspondingly greater sales value.

The machine thus described in connection with the peeling of beets is applicable with considerable efficiency to the peeling of other vegetables, such as potatoes and carrots, and to many fruits, and it is to be understood that in referring to the peeling of beets either in the foregoing specification or the appended claims it is intended to comprehend and include such other vegetables and fruits as are adaptable to peeling in the described manner.

What is claimed is:

1. In a peeling machine, a pair of inclined, similarly tapering cylinders, one within the other, having flexible abrasive members covering the adjacent surfaces thereof, an axial shaft extending through said cylinders and on which the inner cylinder is mounted, means at the upper end of said shaft for swingingly supporting and rotating the same, means for adjusting the inner cylinder lengthwise of said shaft to vary the effective spacing of said abrasive surfaces, a frame stationarily supporting the outer cylinder and having a bearing for the lower end of said shaft to hold the cylinders in coaxial relation, and means for vertically adjusting the lower portion of said frame to vary the inclination of said cylinders.

2. In a beet peeler, a pair of inclined tapering cylinders, one within the other, forming a beet peeling space between the adjacent surfaces thereof, flexible abrasive members covering the adjacent surfaces of said cylinders, a shaft axially of said cylinders and upon which the inner cylinder is mounted, a driven shaft adjacent and at right angles to the upper end of said axial shaft and geared thereto for driving the inner cylinder, a support for the upper end of the axial shaft having a pivotal mounting on said driven shaft, a frame stationarily supporting the outer cylinder and having connection at its upper end with said pivoted support, a bearing carried by the lower portion of said frame for the lower end of the axial shaft, and means in connection with the lower part of said frame for adjustably supporting the same to vary the inclination of the cylinders.

3. In a beet peeler, a pair of inclined tapering cylinders disposed in coaxial relation one within the other and forming a beet peeling space therebetween, an abruptly tapering extension upon the smaller upper end of the inner cylinder, flexible mats secured upon the adjacent faces of the two cylinders, having projecting flexible peeling studs, the studs of the two cylinders extending into the beet peeling space, and the said mats being arranged upon the adjacent surfaces of the cylinders in helical contacting lines and clamps extending transversely of, and at spaced points along, the said mats and securing the same to the cylinder surfaces.

4. In a beet peeler, a pair of inclined tapering cylinders disposed in coaxial relation one within the other and forming a beet peeling space therebetween, an abruptly tapering extension upon the smaller upper end of the inner cylinder, and flexible mats secured upon the adjacent faces of the two cylinders, having projecting flexible peeling studs, the studs of the two cylinders extending into the beet peeling space, the said mats being arranged upon the adjacent surfaces of the cylinders in helical contacting lines, and similar mats with studs disposed angularly and in spaced apart relation upon the extension of the inner cylinder.

5. In a peeling machine, a pair of inclined similarly tapering cylinders, one within the other in spaced apart relation, having flexible abrasive members covering the adjacent surfaces thereof, an axial shaft on which the inner cylinder is splined, an adjusting member clamped at one end to said shaft and having its other end extending through a portion of the inner cylinder, means adjustably clamping the latter end of said member to the inner cylinder whereby the latter may be shifted lengthwise of the shaft to regulate the effective area of the space between the cylinders, means to stationarily support the outer cylinder, and means at one end of the shaft for rotating the same.

6. In a vegetable peeler, tapering inner and outer cylinders forming between them a continuous vegetable peeling space, means for rotating one of said cylinders relative to the other, and abrading members carried by the opposing surfaces of the cylinders, consisting of flexible mats disposed spirally on said cylinder surfaces and having flexible studs projecting toward one another, and clamps securing said spiral mats to the cylinders at spaced points along the mats.

7. In a vegetable peeler, inner and outer tapering cylinders disposed in inclined position and forming a vegetable peeling space therebetween, a shaft extending axially through the cylinders and to which the inner cylinder is adjustably connected, having end portions projecting beyond the cylinders, bearing members for the said shaft to which the outer cylinder is secured, a support, a cross shaft journaled in the support adjacent the upper end of said axial shaft, the upper bearing of the said axial shaft having a yoke in movable connection with the cross shaft to swingingly support the axial shaft, gearing connecting the said shafts, and a vertically adjustable connection between the support and the lower portions of the cylinders to swingingly adjust the same with respect to the cross shaft and thus vary the effective inclination of the cylinders.

GEORGE B. KILE.